(12) United States Patent
Wakabayashi

(10) Patent No.: US 12,715,251 B2
(45) Date of Patent: Aug. 25, 2026

(54) HOUSING BODY WITH FUNCTIONAL COMPONENT, AND TIRE

(71) Applicant: THE YOKOHAMA RUBBER CO., LTD., Kanagawa (JP)

(72) Inventor: Haruna Wakabayashi, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 0 days.

(21) Appl. No.: 18/848,392

(22) PCT Filed: Mar. 16, 2023

(86) PCT No.: PCT/JP2023/010333
§ 371 (c)(1), (2) Date: Sep. 18, 2024

(87) PCT Pub. No.: WO2023/182144
PCT Pub. Date: Sep. 28, 2023

(65) Prior Publication Data

US 2025/0196551 A1 Jun. 19, 2025

(30) Foreign Application Priority Data

Mar. 23, 2022 (JP) ................................ 2022-047068

(51) Int. Cl.
*B60C 23/04* (2006.01)

(52) U.S. Cl.
CPC ................................ *B60C 23/0493* (2013.01)

(58) Field of Classification Search
CPC ...................... B60C 23/0493; B60C 2019/004
See application file for complete search history.

(56) References Cited

U.S. PATENT DOCUMENTS

2015/0151593 A1* 6/2015 Mueller .............. B60C 23/0447 73/146.5
2020/0031178 A1* 1/2020 Ishii ........................ B60C 19/00
2021/0273153 A1* 9/2021 Fudo ....................... B60C 19/00

FOREIGN PATENT DOCUMENTS

| | | | | |
|---|---|---|---|---|
| JP | 2005-156557 A | | 6/2005 | |
| JP | 2006-501560 A | | 1/2006 | |
| JP | 2010-500859 A | | 1/2010 | |
| JP | 2016-505438 A | | 2/2016 | |
| JP | 6272225 B2 | | 1/2018 | |
| JP | 2018016277 A | * | 2/2018 | ............. B60C 19/00 |
| JP | 2018-94968 A | | 6/2018 | |

(Continued)

*Primary Examiner* — Justin R Fischer
*Assistant Examiner* — Philip N Schwartz
(74) *Attorney, Agent, or Firm* — Thorpe North & Western

(57) ABSTRACT

A housing body is adapted to house a functional component to acquire tire information. The functional component includes a housing and a piezoelectric element fixed to a wall surface of the housing. A projection is formed on an inner surface of the housing body. The projection and the piezoelectric element are directly or indirectly in contact with each other via the wall surface of the housing in an unloaded state and in a state where the functional component is housed in the housing body. In a top view of the projection, an area of a bottommost surface of the projection is larger than an area of an uppermost portion of the projection, and an outer edge of the uppermost portion of the projection is located on an inner side of an outer edge of the bottommost surface of the projection.

14 Claims, 7 Drawing Sheets

(56) References Cited

FOREIGN PATENT DOCUMENTS

| | | | | | |
|---|---|---|---|---|---|
| JP | 2018094968 A | * | 6/2018 | ............. | B60C 23/04 |
| JP | 2019-64543 A | | 4/2019 | | |
| JP | 2020-82934 A | | 6/2020 | | |
| WO | 2010/029715 A1 | | 3/2010 | | |
| WO | 2020/129953 A1 | | 6/2020 | | |

* cited by examiner

HOUSING BODY WITH FUNCTIONAL COMPONENT, AND TIRE

TECHNICAL FIELD

The present technology relates to a housing body with a functional component and a tire, and particularly relates to a housing body with a functional component and a tire that enable the functional component to accurately acquire tire internal information while suppressing occurrence of cracks on a projection formed on an inner surface of the housing body by devising an internal shape of the housing body housing the functional component.

BACKGROUND ART

A functional component (for example, a sensor unit including a sensor) configured to acquire tire internal information such as internal pressure or temperature is installed on a tire inner surface (see, for example, Japan Patent No. 6272225 B and Japan Unexamined Patent Publication No. 2016-505438 T). In installing the functional component, a housing body (container) made of rubber or the like is adhered to the tire inner surface, and the functional component is housed inside the adhered housing body. For example, when the functional component includes a piezoelectric element attached to a wall surface of the housing, there is a problem that the functional component may be unable to accurately acquire the tire internal information because, due to the curvature of the tire inner surface or recesses/protrusions caused by bladders or due to up-down movement caused by an impact from tire rolling, the piezoelectric element does not sufficiently come into contact with an inner surface of the housing body and the sensing output of the piezoelectric element is thus not stable.

A projection contactable with the piezoelectric element is disposed on the inner surface of the housing body housing such a functional component, and thereby the accuracy of sensing can be enhanced. However, depending on the shape of the projection, cracks may be generated at the root portion of the projection when vibration during rolling of the tire or an impact at the time of contacting of the tire with the ground is applied to the housing body. As a result, there is room for improvement in durability of the projection itself.

SUMMARY

The present technology provides a housing body with a functional component and a tire that enable the functional component to accurately acquire tire internal information while suppressing occurrence of cracks on a projection formed on an inner surface of the housing body by devising an internal shape of the housing body housing the functional component.

A housing body with a functional component according to an aspect of the present technology is a housing body with a functional component including: a functional component configured to acquire tire information; and a housing body adapted to house the functional component. The functional component includes a housing containing an electronic component, and a piezoelectric element having a film-shape and being fixed to a wall surface of the housing. At least one projection is formed on an inner surface of the housing body, and at least a part of the projection and the piezoelectric element are directly in contact with each other or indirectly in contact with each other via the wall surface of the housing in an unloaded state and in a state where the functional component is housed in the housing body. In a top view of the projection, an area of a bottommost surface of the projection is larger than an area of an uppermost portion of the projection, and an outer edge of the uppermost portion of the projection is located on an inner side of an outer edge of the bottommost surface of the projection.

In addition, a tire according to an aspect of the present technology includes the aforementioned housing body with a functional component fixed to a tire inner surface, the functional component being housed in the housing body.

According to an aspect of the present technology, the housing body with a functional component includes: the functional component configured to acquire tire information; and the housing body adapted to house the functional component. The functional component includes a housing containing the electronic component, and a piezoelectric element having a film-shape and being fixed to the wall surface of the housing, at least one projection is formed on an inner surface of the housing body, and at least a part of the projection and the piezoelectric element are directly in contact with each other or indirectly in contact with each other via the wall surface of the housing in an unloaded state and in a state where the functional component is housed in the housing body. As a result, a pressed state of the projection against the piezoelectric element by vibration of the tire during travel is held, which enables stable sensing by the piezoelectric element. Further, in the top view of the projection, the area of the bottommost surface of the projection is larger than the area of the uppermost portion of the projection, and the outer edge of the uppermost portion of the projection is located on the inner side of the outer edge of the bottommost surface of the projection. Thus, even when vibration during rolling of the tire or an impact at the time of contacting of the tire with the ground is applied to the housing body, stress concentration is less likely to occur at the root portion of the projection due to the shape of the projection. As a result, the occurrence of cracks at the root portion of the projection can be suppressed. As described above, the functional component can accurately acquire the tire internal information without influence by the curvature of the tire inner surface or recesses/protrusions due to bladders while suppressing the occurrence of cracks at the root portion of the projection.

In the housing body with a functional component according to an aspect of the present technology, when a height position of 95% of a height h of the projection from the inner surface of the housing body on which the projection is formed is defined as a position G, an area S of the projection at the position G and an area A of the bottommost surface of the projection preferably satisfy a relationship $A \geq 1.04 \times S$. Accordingly, the occurrence of cracks at the root portion of the projection can be effectively suppressed, and the durability of the projection can be improved.

An area A of the bottommost surface of the projection and an area A' of a bottom surface of an inner portion of the housing body preferably satisfy a relationship $A \leq 0.82 \times A'$. Accordingly, the attachment state of the functional component with respect to the housing body can be grasped based on the detection result of the piezoelectric element.

When a lateral point of the projection at a height half a height h of the projection from the inner surface of the housing body on which the projection is formed is defined as point M, an angle $\alpha$ formed by a straight line connecting an end point P of the uppermost portion of the projection and the point M and a straight line passing through the end point P and parallel to the bottommost surface of the projection is preferably 30° to 90°. Accordingly, the occurrence of cracks at the projection can be effectively suppressed, and the durability of the projection can be improved. In addition, the sensing output by the piezoelectric element can be sufficiently ensured.

When a lateral point of the projection at a height half a height h of the projection from the inner surface of the housing body on which the projection is formed is defined as point M, an angle β formed by a straight line connecting an end point Q of the bottommost surface of the projection and the point M and the inner surface of the housing body on which the projection is formed is preferably 90° to 180°. Accordingly, the occurrence of cracks at the root portion of the projection can be effectively suppressed, and the durability of the projection can be improved.

A contact area between the projection and the piezoelectric element is preferably 50% or less with respect to an area of the inner surface of the housing body on which the projection is formed, and is preferably 10% to 100% with respect to a surface area of a pressure sensing portion of the piezoelectric element. Accordingly, the contact area between the projection and the piezoelectric element is sufficiently ensured, and the contact state between the projection and the piezoelectric element is favorably maintained, which contributes to stable sensing by the piezoelectric element.

A height h of the projection from the inner surface of the housing body on which the projection is formed is preferably 0.1 mm to 2.0 mm. Accordingly, the contact state between the projection and the piezoelectric element can be appropriately maintained. In addition, the functional component can be prevented from falling off during travel without influence on an operation for housing the functional component in the housing body.

The projection is preferably made of vulcanized rubber having a modulus at 100% elongation of 1.0 MPa or more and less than 12.0 MPa. Accordingly, the durability of the housing body and ease of housing the functional component in the housing body can be provided in a compatible manner.

The tire according to an embodiment of the present technology is preferably a pneumatic tire but may be a non-pneumatic tire. In a case of a pneumatic tire, the interior thereof can be filled with any gas including air and inert gas such as nitrogen.

BRIEF DESCRIPTION OF DRAWINGS

FIG. 2A is a cross-sectional view of the entire housing body, and FIGS. 2B and 2C are each a cross-sectional view of a main part of the housing body.

FIG. 3A is a top view (view from above) and a cross-sectional view (bottom view) of the housing body, and FIG. 3B is an enlarged cross-sectional view illustrating a projection formed on the housing body.

FIG. 5A is a cross-sectional view of the projection, and FIG. 5B is a perspective view of the projection.

FIG. 7A is a perspective view illustrating a state where the functional component is not housed, FIG. 7B is a cross-sectional view illustrating a state where the functional component is not housed, FIG. 7C is a perspective view illustrating a state where the functional component is housed, and FIG. 7D is a cross-sectional view illustrating a state where the functional component is housed.

FIGS. 8A to 8C are half cross-sectional views of the housing body with a functional component for describing the dimensions of the housing body.

DETAILED DESCRIPTION

Figure 1:
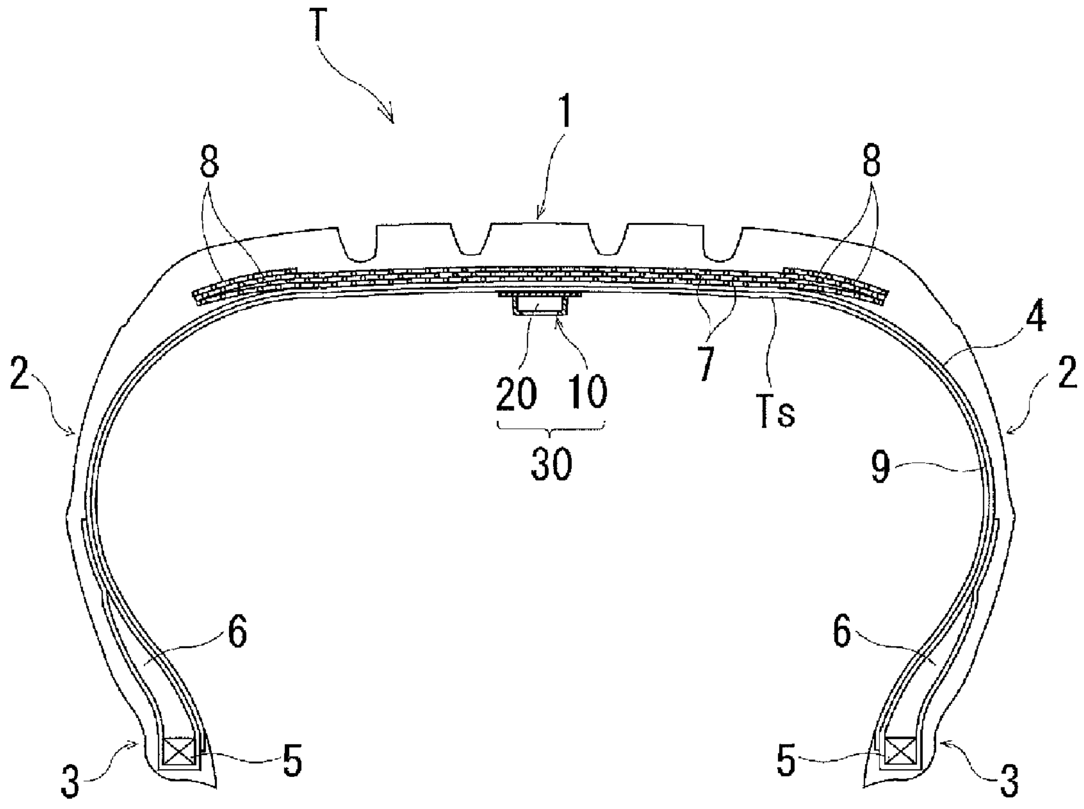
FIG. 1 is a meridian cross-sectional view illustrating an embodiment of a pneumatic tire in which a housing body with a functional component is fixed to a tire inner surface.

A pneumatic tire according to embodiments of the present technology will be described below in detail with reference to the accompanying drawings. FIG. 1 illustrates a pneumatic tire in which a housing body with a functional component is fixed to a tire inner surface.

As illustrated in FIG. 1, a pneumatic tire T includes a tread portion 1 extending in a tire circumferential direction and having an annular shape, a pair of sidewall portions 2 disposed on both sides of the tread portion 1, and a pair of bead portions 3 disposed on an inner side of the sidewall portions 2 in a tire radial direction.

A carcass layer 4 is mounted between the pair of bead portions 3. The carcass layer 4 includes a plurality of reinforcing cords extending in the tire radial direction and is folded back around a bead core 5 disposed in each of the bead portions 3 from a tire inner side to a tire outer side. A bead filler 6 having a triangular cross-sectional shape and formed of a rubber composition is disposed on the outer circumference of the bead core 5. In addition, an innerliner layer 9 is disposed in an area between the pair of bead portions 3 on a tire inner surface Ts. The innerliner layer 9 forms the tire inner surface Ts.

On the other hand, a plurality of belt layers 7 is embedded on the outer circumferential side of the carcass layer 4 in the tread portion 1. The belt layers 7 include a plurality of reinforcing cords that are inclined with respect to the tire circumferential direction, and the reinforcing cords are disposed so as to intersect each other between the layers. In the belt layers 7, the inclination angle of the reinforcing cords with respect to the tire circumferential direction is set to fall in a range from 10° to 40°, for example. Steel cords are preferably used as the reinforcing cords of the belt layers 7. To improve high-speed durability, at least one belt cover layer 8 formed by arranging reinforcing cords at an angle of, for example, 5° or less with respect to the tire circumferential direction is disposed on an outer circumferential side of the belt layers 7. Organic fiber cords such as nylon and aramid are preferably used as the reinforcing cords of the belt cover layer 8.

Note that the tire internal structure described above represents a typical example for a pneumatic tire, but the pneumatic tire is not limited thereto.

In the pneumatic tire described above, at least one housing body with a functional component 30 is attached to the tire inner surface Ts. The housing body with a functional component 30 can be attached to any portion of the tire inner surface Ts. However, the housing body with a functional component 30 is preferably attached to the tire inner surface Ts corresponding in particular, to the tread portion 1 because the housing body with a functional component 30 is less deformed during travel and is unlikely to come off due to centrifugal force applied thereto. The housing body with a functional component 30 includes a functional component 20 configured to acquire tire information and a housing body 10 housing the functional component 20. The housing body with a functional component 30 is fixed to the tire inner surface Ts with an adhesive layer formed of, for example, an adhesive or double-sided tape.

Figure 2A:
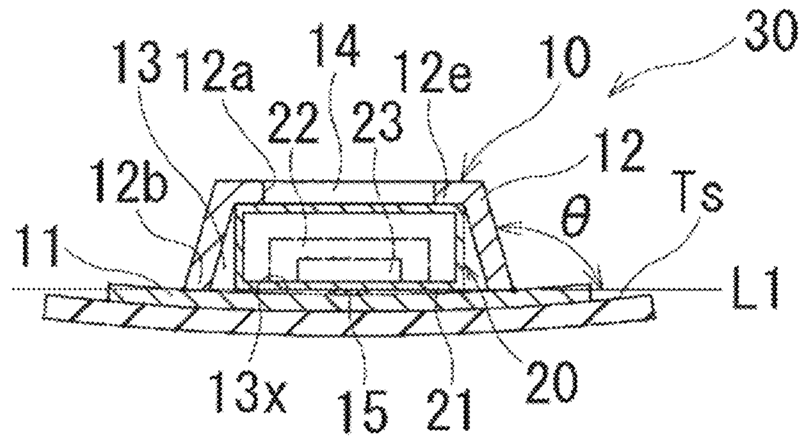
FIGS. 2A to 2C illustrate an embodiment of the housing body with a functional component.
Figure 2B:
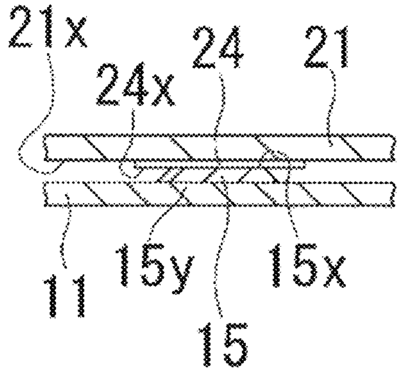
Figure 2C:
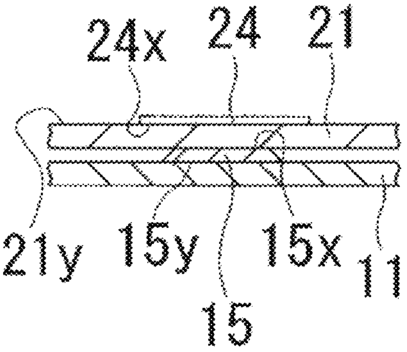

As illustrated in FIGS. 2A to 2C, the housing body 10 includes a flat plate-shaped bottom portion 11 fixed to the tire inner surface Ts, a cylindrical crown portion 12 protruding from the bottom portion 11, a housing space 13 formed by the bottom portion 11 and the crown portion 12, and an opening portion 14 communicating with the housing space 13.

The bottom portion 11 is the longest (and has the maximum diameter) among the portions constituting the housing body 10. The crown portion 12 is formed to be inclined inward from a direction orthogonal to the bottom portion 11. Accordingly, the housing space 13 formed by the bottom portion 11 and the crown portion 12 has a substantially trapezoidal cross-sectional shape. In other words, the cross-sectional width of the housing space 13 gradually decreases toward an upper portion and becomes smallest at the maximum height position. The crown portion 12 includes a locking portion 12*e* formed at one end 12*a* so as to be bent toward the opening portion 14, and an other end 12*b* is fixed to the bottom portion 11. After the functional component 20 is housed, the locking portion 12*e* is brought into contact with an upper surface of the functional component 20 and serves to fix the functional component 20 when the functional component 20 is housed. The width of the opening portion 14 into which the functional component 20 is inserted is smaller than the minimum width of the housing space 13 in a cross-sectional view (the width at a position adjacent to the opening portion 14).

In FIGS. 2A to 2C, each of the bottom portion 11, the crown portion 12, and the opening portion 14 has a circular planar shape. The planar shapes of the bottom portion 11, the crown portion 12, and the opening portion 14 are not limited to a particular shape and may be any other planar shape or may be planar shapes different from each other. The shape of the housing space 13 is a truncated cone but is not particularly limited.

At least one projection 15 is formed on an inner surface of the housing body 10. In FIGS. 2A to 2C, the projection 15 is formed to project from the bottom portion 11 of the housing body 10. Two or more projections 15 may be formed on the bottom portion 11 of the housing body 10, but one projection 15 is preferable from the perspective of durability. In addition, one or two or more projections 15 may be formed on another portion (for example, the crown portion 12) of the housing body 10.

As illustrated in FIG. 2A, the functional component 20 includes a housing 21 and an electronic component 22. The housing 21 has a hollow structure, and the electronic component 22 is housed therein. The electronic component 22 can include a sensor 23 configured to acquire tire information, a transmitter, a receiver, a control circuit, and a battery as appropriate. Examples of the tire information acquired by the sensor 23 include an amount of wear and the like of the tread portion 1 of the pneumatic tire. In a case where an amount of wear of the tread portion 1 is detected, a piezoelectric sensor including at least one piezoelectric element 24 can be used as the sensor 23, and the piezoelectric element 24 detects an output voltage corresponding to tire deformation during travel and detects an amount of wear of the tread portion 1 based on the output voltage. Moreover, a temperature sensor, a pressure sensor, an acceleration sensor, a magnetic sensor, or the like can be added. The functional component 20 is configured to transmit the tire information acquired by the sensor 23 to the outside of the tire. Furthermore, to easily hold the functional component 20, a knob portion protruding from an upper surface of the housing 21 may be provided, and the knob portion can have a function of an antenna.

At least one film-shaped piezoelectric element 24 is fixed to a wall surface of the housing 21 of the functional component 20. The piezoelectric element 24 can be disposed on either the outer surface or the inner surface of the housing 21. In the present technology, the projection 15 is provided at a position corresponding to the piezoelectric element 24, and has a contact surface on the piezoelectric element 24 side therewith. Such a piezoelectric element 24 is configured to be in contact directly or indirectly via the wall surface of the housing 21 with at least a part of the projection 15 in a state where the housing body with a functional component or the tire is in an unloaded state and the functional component 20 is housed in the housing body 10. Specifically, FIG. 2B illustrates a state where the piezoelectric element 24 is disposed on an outer surface 21*x* of a bottom portion of the housing 21 and the piezoelectric element 24 and the projection 15 are directly in contact with each other, and FIG. 2C illustrates a state where the piezoelectric element 24 is disposed on an inner surface 21*y* of the bottom portion of the housing 21 and the piezoelectric element 24 is indirectly in contact with the projection 15 via the wall surface of the housing 21. The piezoelectric element 24 includes a pressure sensing portion 24*x*, which is a contact surface with the projection 15, on the projection 15 side. Note that the sensor 23 and the piezoelectric element 24 are connected to each other.

In the present technology, the projection 15 is a portion for pressing the piezoelectric element 24, and the projection 15 is pressed by the functional component 20 after the functional component 20 is housed, but the bottom portion 11 of the housing body 10 is not deformed along the tire inner surface Ts. In addition, the projection 15 of the housing body 10 and the housing 21 of the functional component 20 are not fitted to each other, and a recess portion to which the projection 15 is fitted is not disposed in the bottom portion of the housing 21.

Figure 3A:
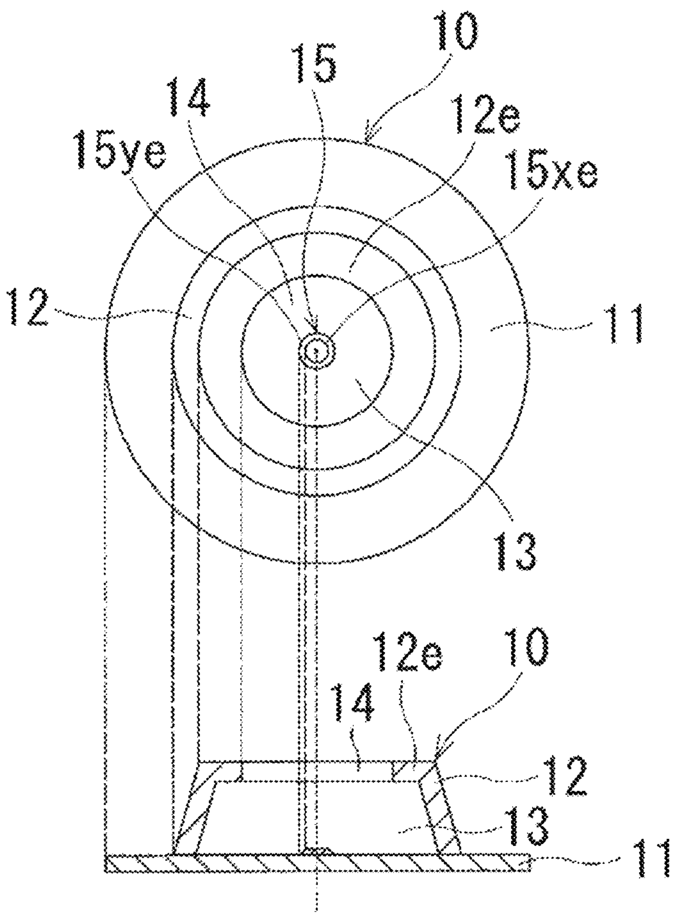
FIGS. 3A and 3B illustrate an embodiment of the housing body with a functional component before the functional component is housed.
Figure 3B:
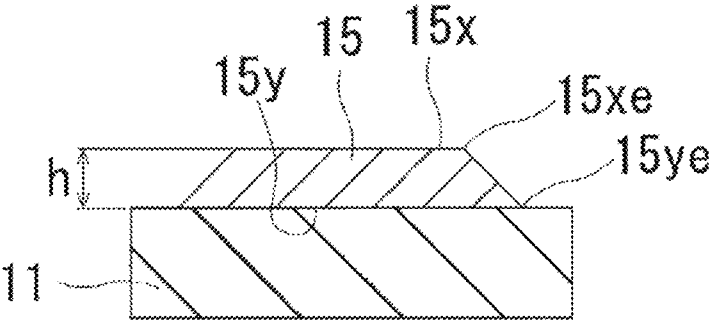
Figure 4A:
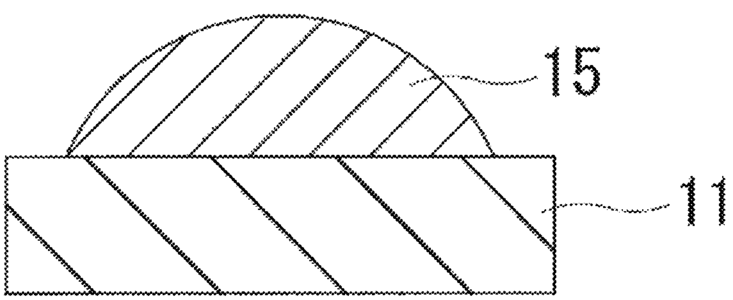
FIGS. 4A to 4D are cross-sectional views illustrating other embodiments of the projection.
Figure 4B:
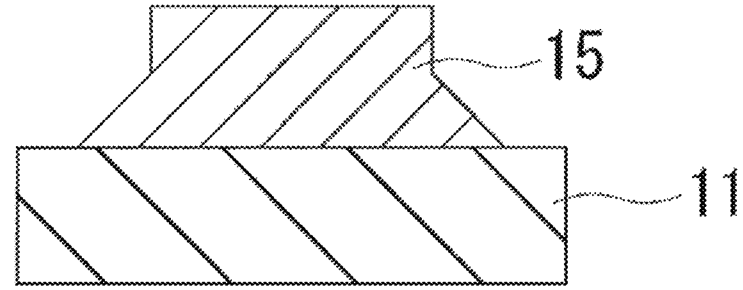
Figure 4C:
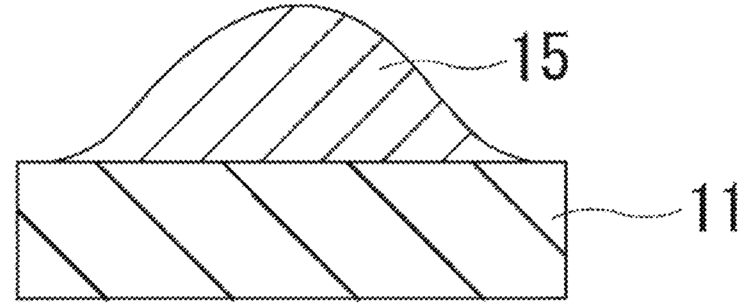
Figure 4D:
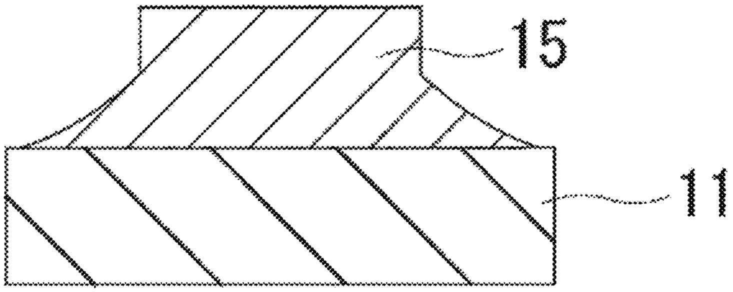

In such a housing body 10, the projection 15 is tapered as illustrated in FIGS. 3A and 3B. In other words, in a top view of the projection 15, the area of a bottommost surface 15*y* is larger than the area of an uppermost portion 15*x*, and an outer edge 15*xe* of the uppermost portion 15*x* is located on an inner side of an outer edge 15*ye* of the bottommost surface 15*y*. As a shape satisfying such conditions, a truncated cone as illustrated in FIGS. 3A and 3B is exemplified, but other shapes may be used such as a substantially hemispherical shape as a whole as illustrated in FIG. 4A, a cylindrical shape at the upper portion and a truncated cone at the lower portion as illustrated in FIG. 4B, a hemispherical shape at the upper portion and the bottom portion continuous with the upper portion and having a diameter gradually increasing toward the bottom portion 11 as illustrated in FIG. 4C, and a cylindrical shape at the upper portion and the lower portion continuous with the upper portion and having a diameter gradually increasing diameter toward the bottom portion 11 as illustrated in FIG. 4D. In other words, the uppermost portion 15*x* of the projection 15 may be a surface or a point depending on the shape. In addition, the planar shape of the projection 15 is not particularly limited, and any shape such as a circular shape, a triangular shape, or a quadrangular shape can be adopted.

In the pneumatic tire described above, the functional component 20 includes the housing 21 containing the electronic component 22 and the film-shaped piezoelectric element 24 fixed to the wall surface of the housing 21, at least one projection 15 is formed on the inner surface of the housing body 10, and at least a part of the projection 15 and the piezoelectric element 24 are directly in contact with each other or indirectly in contact with each other via the wall surface of the housing 21 in an unloaded state and in a state where the functional component 20 is housed in the housing body 10. As a result, a pressed state of the projection 15 against the piezoelectric element 24 by vibration of the tire during travel is held, which enables stable sensing by the piezoelectric element 24. Further, in the top view of the projection 15, the area of the bottommost surface 15*y* is larger than the area of the uppermost portion 15*x*, and the outer edge 15*xe* of the uppermost portion 15*x* is located on the inner side of the outer edge 15*ye* of the bottommost surface 15*y*. Thus, even when vibration during rolling of the tire or an impact at the time of contacting of the tire with the ground is applied to the housing body 10, stress concentration is less likely to occur at the root portion of the projection 15 due to the shape of the projection 15. As a result, the occurrence of cracks at the root portion of the projection 15 can be suppressed. As described above, the functional component 20 can accurately acquire the tire internal information without influence by the curvature of the tire inner surface Ts or recesses/protrusions due to bladders while suppressing the occurrence of cracks at the root portion of the projection 15.

Figure 5A:
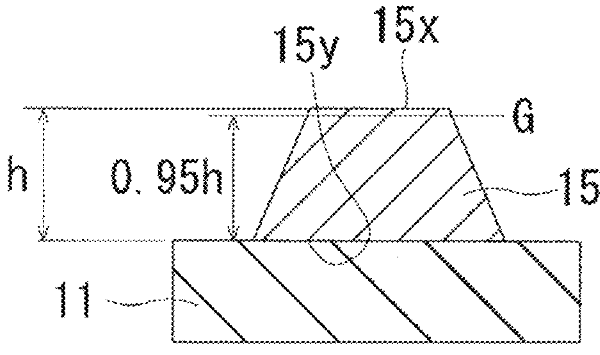
FIGS. 5A and 5B illustrate another embodiment of the projection.
Figure 5B:
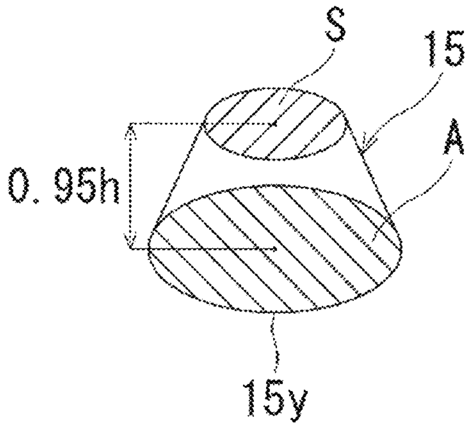

In the pneumatic tire described above, the projection 15 includes the following configuration. Specifically, as illustrated in FIGS. 5A and 5B, a height position of 95% (0.95×h) of the height h of the projection 15 from the inner surface (bottom portion 11) of the housing body 10 on which the projection 15 is formed is defined as a position G. In this case, an area S of the projection 15 at the position G and an area A of the bottommost surface 15*y* of the projection 15 preferably satisfy the relationship $A \geq 1.04 \times S$, more preferably satisfy the relationship $A \geq 1.10 \times S$, and most preferably satisfy the relationship $A \geq 1.19 \times S$. By setting the area of each portion of the projection 15 so as to satisfy such a relationship formula, the occurrence of cracks at the root portion of the projection 15 can be effectively suppressed, and the durability of the projection 15 can be improved.

Furthermore, the area A of the bottommost surface 15*y* of the projection 15 and an area A' of the bottom surface of the inner portion of the housing body 10 (that is, the bottom surface of the housing space 13) preferably satisfy the relationship $A \leq 0.82 \times A'$, and more preferably satisfy the relationship $A \leq 0.74 \times A'$. By appropriately setting the area A of the bottommost surface 15*y* of the projection 15 so as to satisfy such a relationship formula, the attachment state of the functional component 20 with respect to the housing body 10 can be grasped based on the detection result of the piezoelectric element 24. For example, when the functional component 20 is not appropriately attached to the housing body 10, the detection result of the piezoelectric element 24 does not indicate a normal waveform, and the presence of abnormality in the attachment state of the functional component 20 can be detected.

Figure 6:
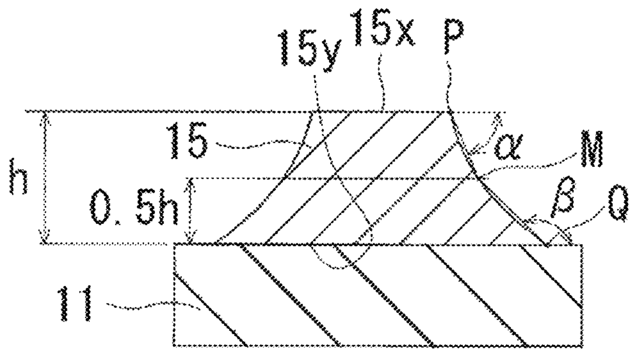
FIG. 6 is a cross-sectional view illustrating another embodiment of the projection.

As illustrated in FIG. 6, an end point of the projection 15 at a height position of a half (0.5×h) of the height h of the projection 15 from the inner surface (bottom portion 11) of the housing body 10 on which the projection 15 is formed is defined as a point M. In this case, an angle α formed by a straight line connecting an end point P of the uppermost portion 15*x* of the projection 15 and the point M and a straight line passing through the end point P and 30 parallel to the bottommost surface 15*y* of the projection 15 is preferably 30° to 90°, and is more preferably 30° to 75°. By appropriately setting the angle α as just described, the occurrence of cracks at the projection 15 can be effectively suppressed, and the durability of the projection 15 can be improved. In addition, the sensing output by the piezoelectric element 24 can be sufficiently ensured. The angle α is obtained by measuring an angle on the acute angle side of the angle formed by the straight line connecting the end point P and the point M and the straight line passing through the end point P and parallel to the bottommost surface 15*y* of the projection 15.

Here, when the angle α is larger than 90°, a constricted part is formed at an intermediate position in the height direction of the projection 15, and thus cracks are likely to be generated and the durability of the projection 15 cannot be sufficiently improved. On the other hand, when the angle α is smaller than 30°, the projection amount of the projection 15 cannot be sufficiently ensured, and pressing force applied to the piezoelectric element 24 by the projection 15 is reduced. As a result, the sensing output by the piezoelectric element 24 cannot be sufficiently ensured.

Moreover, an angle β formed by a straight line connecting an end point Q of the bottommost surface 15*y* of the projection 15 and the point M and the inner surface (bottom portion 11) of the housing body 10 on which the projection 15 is formed is preferably 90° to 180°, and is more preferably 120° to 180°. In particular, the angle β is preferably 170° or smaller, and is more preferably 160° or smaller. By appropriately setting the angle β as just described, the occurrence of cracks at the root portion of the projection 15 can be effectively suppressed, and the durability of the projection 15 can be improved. The angle β is obtained by measuring an angle on the obtuse angle side of the angle formed by the straight line connecting the end point Q and the point M and the inner surface of the housing body 10 on which the projection 15 is formed.

Here, when the angle β is smaller than 90°, cracks are likely to be generated at the end point Q of the bottommost surface 15*y* of the projection 15, and the durability of the projection 15 cannot be sufficiently improved.

In the pneumatic tire described above, the contact area between the projection 15 (uppermost portion 15*x*) and the piezoelectric element 24 (pressure sensing portion 24*x*) is preferably 50% or less of the area of the inner surface of the housing body 10 on which the projection 15 is formed. Here, the area of the inner surface of the housing body 10 on which the projection 15 is formed is the area of a surface 13*x* of the housing space 13 corresponding to the inner surface on which the projection 15 is formed, and means, for example, the area of the bottom surface of the housing space 13 in FIG. 2A. In this case, further, the contact area between the projection 15 and the piezoelectric element 24 is preferably 10% to 100% and more preferably 40% to 100% with respect to the surface area of the pressure sensing portion 24*x* of the piezoelectric element 24. When a plurality of projections 15 are formed on the inner surface of the housing body 10, the total contact area between the projections 15 and the piezoelectric element 24 is designed to be within the range described above. When the projection 15 is formed to have an end portion having a sharp point, for example, like a conical shape, the contact area is determined based on a contact area measured when the end portion of the projection 15 is crushed and flattened in a state where the housing body with a functional component or the tire is in an unloaded state and in a state where the functional component 20 is housed in the housing body 10.

By appropriately setting the contact area between the projection 15 and the piezoelectric element 24 as just described, the contact area between the projection 15 and the piezoelectric element 24 is sufficiently ensured, and the contact state between the projection 15 and the piezoelectric element 24 is favorably maintained, which contributes to stable sensing by the piezoelectric element 24.

The projection 15 is pressed against the piezoelectric element 24 or the wall surface of the housing 21 by elasticity of the housing body 10 after the functional component 20 is housed: however, when the contact area between the projection 15 and the piezoelectric element 24 is excessively large with respect to the surface area of the pressure sensing portion 24*x* of the piezoelectric element 24, pressing force due to tire rolling is dispersed to portions other than the piezoelectric element 24, and the sensing output by the piezoelectric element 24 may be decreased. On the other hand, when the contact area between the projection 15 and the piezoelectric element 24 is excessively small with respect to the surface area of the pressure sensing portion 24*x* of the piezoelectric element 24, a load is locally applied to the piezoelectric element 24. As a result, the durability of the piezoelectric element 24 may be deteriorated undesirably.

The height h of the projection 15 is preferably 0.1 mm to 2.0 mm, and more preferably 0.5 mm to 1.0 mm. Here, the height h of the projection 15 is a height from the inner surface (for example, an end surface of the bottom portion 11 of the housing body 10 in FIG. 3B) of the housing body 10 on which the projection 15 is formed, and is measured in a state where the functional component 20 is not housed in the housing body 10. By appropriately setting the height h of the projection 15 as just described, the contact state between the projection 15 and the piezoelectric element 24 can be appropriately maintained. In addition, the functional component 20 can be prevented from falling off during travel without influence on an operation for housing the functional component 20 in the housing body 10.

Here, when the height h of the projection 15 is smaller than 0.1 mm, the effect of improving the contact state with the piezoelectric element 24 cannot be sufficiently obtained. On the other hand, when the height h of the projection 15 is larger than 2.0 mm, it is difficult to house the functional component 20 in the housing body 10, and the risk of falling off of the functional component 20 during travel increases.

The projection 15 is preferably made of vulcanized rubber having a modulus at 100% elongation of 1.0 MPa or more and less than 12.0 MPa. The projection 15 includes such physical properties, and thus the durability of the housing body 10 and ease of housing the functional component 20 in the housing body 10 can be provided in a compatible manner. In addition, the projection 15 can be made of the same material as the housing body 10. For example, the projection 15 may be integrally formed from rubber having hardness different from that of the housing body 10 by using a mold for forming the housing body 10, or the projection 15 formed separately from the housing body 10 may be bonded to the inner surface of the housing body 10.

Figure 7A:
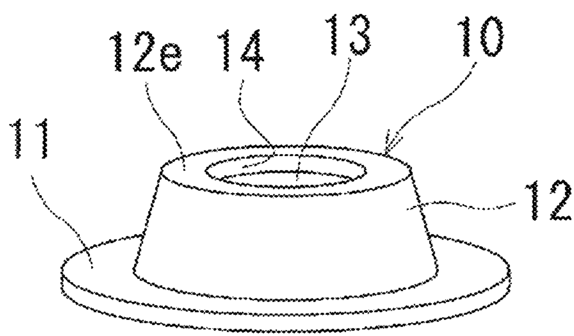
FIGS. 7A to 7D illustrate an embodiment of the housing body with a functional component before and after the functional component is housed.
Figure 7B:
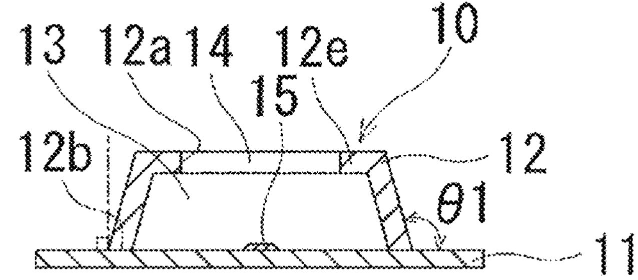
Figure 7C:
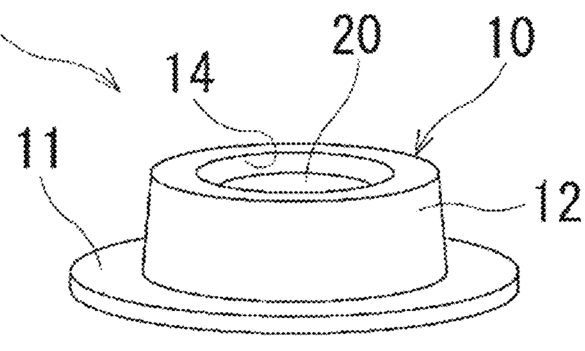
Figure 7D:
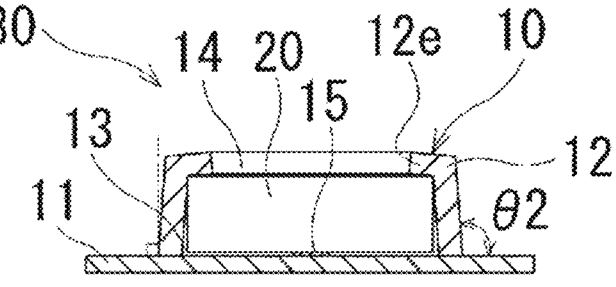

FIGS. 7A to 7D illustrate an embodiment of the housing body with a functional component before and after the functional component is housed. The housing body with a functional component 30 in FIGS. 7A and 7B is in a state where the functional component 20 is not housed in the housing body 10, and the housing body with a functional component 30 in FIGS. 7C and 7D is in a state where the functional component 20 is housed in the housing body 10.

As illustrated in FIGS. 7A to 7D, in the housing body with a functional component 30, an inclination angle θ2 of the crown portion 12 with respect to the bottom portion 11 in a state where the functional component 20 is housed in the housing space 13 is configured to be smaller than an inclination angle θ1 of the crown portion 12 with respect to the bottom portion 11 in a state where the functional component 20 is not housed in the housing space 13. Each of the inclination angles θ1, θ2 is an angle measured on the outer wall side of the crown portion 12. When the functional component 20 is housed in the housing space 13 from the opening portion 14, the crown portion 12 flexes toward the outer side and deforms so as to expand the width of the opening portion 14, and thus the inclination angle θ of the crown portion 12 with respect to the bottom portion 11 decreases. The angle difference (θ1−θ2) between the inclination angle θ1 before the functional component 20 is housed and the inclination angle θ2 after the functional component 20 is housed is preferably configured to be in the range of 5° to 15°.

Here, in measuring the inclination angle θ (θ1, θ2) of the crown portion 12, the angle can be calculated by using a CT scan or the like. Here, as illustrated in FIG. 2A, when the inclination angles θ1, θ2 are measured, an angle formed by a straight line L1 passing through an other end 12*b* of both sides of the crown portion 12 in a cross-sectional view and the crown portion 12 is measured. For example, even a housing body with a functional component that is not provided with a member corresponding to a bottom portion and is provided with a crown portion directly fixed to the tire inner surface can be measured by the same method as described above.

Figures 8A, 8B, 8C:
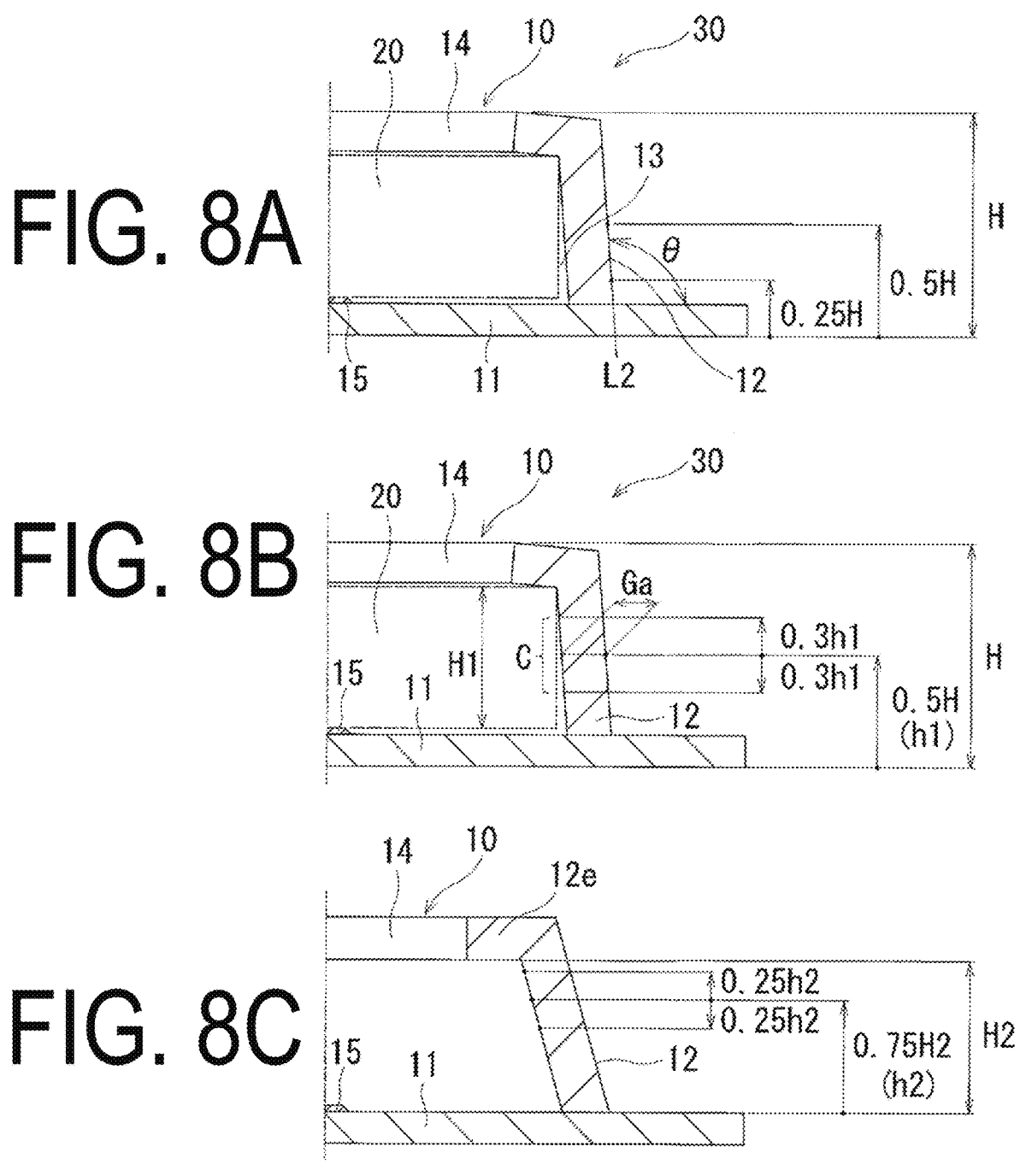

Further, only in measuring the inclination angle θ of the crown portion 12, as illustrated in FIG. 8A, the inclination angle θ1 before the functional component 20 is housed and the inclination angle θ2 after the functional component 20 is housed are respectively measured by regarding, as the crown portion 12, a straight line L2 passing through two points corresponding to one half of a total height H (0.5×H) and one quarter of the total height H (0.25×H) of the housing body 10 on the outer surface of the crown portion 12. The total height H (maximum height H) of the housing body 10 changes before and after the functional component 20 is housed, and the inclination angle θ (θ1, θ2) of the crown portion 12 is measured based on each height. Furthermore, when a projection portion is formed on the outer surface of the crown portion 12 at the position corresponding to one half and/or one quarter of the total height H of the housing body 10, the inclination angle θ of the crown portion 12 is measured based on a straight line defined by using a lower end portion of the projection portion as a new reference point without including the projection portion. The total height H of the housing body 10 is a height from a lower surface of the bottom portion 11 to an upper surface of the locking portion 12*e*.

The housing body with a functional component 30 as just described is configured such that the housing body 10 includes the bottom portion 11 fixed to the tire inner surface Ts, the crown portion 12 protruding from the bottom portion 11, the housing space 13 formed by the bottom portion 11 and the crown portion 12, and the opening portion 14 communicating with the housing space 13, the inclination angle θ2 of the crown portion 12 with respect to the bottom portion 11, measured on the outer wall side of the crown portion 12 in a state where the functional component 20 is housed in the housing space 13 is smaller than the inclination angle θ1 of the crown portion 12 with respect to the bottom portion 11, measured on the outer wall side of the crown portion 12 in a state where the functional component 20 is not housed in the housing space 13. Thus, in the housing body 10 housing the functional component 20, excessive deformation of the housing body 10 can be prevented while ensuring the restricting force by which the functional component 20 can be sufficiently restricted. In particular, when the angle difference (θ1−θ2) between the inclination angles before and after the functional component 20 is housed is in the range of 5° to 15°, the restricting force of the housing body 10 with respect to the functional component 20 and the degree of deformation at which the housing body 10 is not damaged is extremely well-balanced. This can prevent the damage of the housing body 10 while preventing the functional component 20 from coming off during travel.

Here, when the angle difference (θ1−θ2) of the inclination angles is smaller than 5°, the restricting force of the housing body 10 with respect to the functional component 20 is reduced. As a result, the risk of coming off of the functional component 20 during travel increases and the motion of the functional component 20 increases, and thus the durability of the housing body 10 is reduced. On the other hand, when the angle difference (θ1−θ2) between the inclination angles is larger than 15°, the deformation of the housing body 10 becomes excessively large, and cracks are likely to occur in the housing body 10 during long-distance travel.

In particular, the inclination angle θ2 of the crown portion 12 with respect to the bottom portion 11 in a state where the functional component 20 is housed in the housing space 13 is preferably 90° or more and more preferably in the range of 90° to 115°. By appropriately setting the inclination angle θ2 after the functional component 20 is housed as just described, stress concentration at the base of the crown portion 12 of the housing body 10 can be mitigated, and the durability of the housing body 10 can be improved. Furthermore, the opening portion 14 of the housing body 10 is not excessively narrow; which is suitable in removing the functional component 20.

Here, when the inclination angle θ2 after the functional component 20 is housed is smaller than 90°, stress concentration at the base of the crown portion 12 of the housing body 10 increases, and strain energy during travel increases. As a result, cracks are likely to occur at the base of the crown portion 12. On the other hand, when the inclination angle θ2 after the functional component 20 is housed is larger than 115°, the crown portion 12 is excessively flexed even after the functional component 20 is housed. This makes the width of the opening portion 14 excessively narrow and makes it difficult to remove the functional component 20.

In a state where the functional component 20 is housed in the housing space 13, the crown portion 12 preferably has a thickness Ga of 1.0 mm to 3.5 mm. Here, as illustrated in FIG. 8B, a half height of the total height H of the housing body 10 after the functional component 20 is housed is h1, and the range of ±30% of the height h1 (0.3×h1) with reference to the position (center position) of the height h1 is a central range C. At this time, in the entire central range C, the thickness Ga of the crown portion 12 measured in a horizontal direction is preferably in the range of 1.0 mm to 3.5 mm.

By appropriately setting the thickness Ga of the crown portion 12 as just described, the occurrence of cracks in the crown portion 12 of the housing body can suppressed, and the durability of the housing body 10 can be improved. Furthermore, when the thickness Ga of the crown portion 12 of the housing body 10 is excessively large, the heat generation of the housing body 10 increases. However, when the thickness Ga is within the range described above, the heat generation of the housing body 10 can be suppressed, and damage of the housing 21 of the functional component 20 can be prevented.

Here, when the thickness Ga of the crown portion 12 is less than 1.0 mm, the thickness Ga of the crown portion 12 is excessively small, and cracks are likely to occur in the crown portion 12. On the other hand, when the thickness Ga of the crown portion 12 is larger than 3.5 mm, the heat generation of the housing body 10 (for example, rubber) increases, and the housing 21 of 20) the functional component 20 is likely to be damaged.

The end **12*a* of the crown portion 12 includes the locking portion 12*e* bent toward the opening portion 14, and the height H1 of the functional component 20 and the total inner height H2 of the housing body 10 satisfy the relationship 0.85≤H2/H1≤0.98. Here, as illustrated in FIG. 8B, the height H1 of the functional component 20 is the maximum height within a range in which the functional component 20 is housed in the housing body 10 after the functional component 20 is housed, that is, the maximum height of the functional component 20 in the housing space 13. This means that when, for example, a knob portion disposed on an upper portion of the functional 30) component 20 protrudes from the housing space 13, the height H1 of the functional component 20 does not include the height of a portion of the knob portion outside the housing space 13. The total inner height H2 of the housing body 10 is a height from an upper surface of the bottom portion 11 to a lower surface of the locking portion 12*e* before the functional component 20** is housed.

By appropriately setting the height H1 of the functional component 20 and the total inner height H2 of the housing body 10 as just described, a good balance between the restricting force of the housing body 10 with respect to the functional component 20 and the degree of deformation at which the housing body 10 is not damaged can be provided, and the durability of the functional component 20 during high-speed travel can be improved.

Here, when the ratio H2/H1 is less than 0.85, the locking portion **12*e* cannot house the functional component 20 so as to cover the functional component 20, and thus the effect of improving the durability of the functional component 20 during high-speed travel is reduced. On the other hand, when the ratio H2/H1 is larger than 0.98, the restricting force of the housing body 10 decreases, and the motion of the functional component 20 in the housing body 10 increases. As a result, the effect of improving the durability of the functional component 20** during high-speed travel cannot be obtained.

The width of the opening portion 14 is preferably smaller than the minimum width of the housing space 13, and a circumferential length $D2_u$ of the upper portion of the housing space 13 and a circumferential length $D1_u$ of an upper portion of the functional component 20 preferably satisfy the relationship $0.60 \leq D2_u/D1_u \leq 0.95$. In other words, the circumferential length $D2_u$ of the housing space 13 is set to be smaller than the circumferential length $D1_u$ of the functional component 20 within a specific range, and it is thereby intended to increase restricting force by the housing body 10. Here, as illustrated in FIG. 8C, the circumferential length $D2_u$ of the housing space 13 is obtained by defining a height of three quarters of the total inner height H2

(0.75×H2) of the housing body 10 as h2 before the functional component 20 is housed, measuring the circumferential length of the housing space 13 at a total of three positions including the position of the height h2 and the positions corresponding to ±25% of the height h2 (0.25×h2) with reference to the position of the height h2, and averaging the circumferential lengths measured at these three positions. The circumferential length $D1_u$ of the upper portion of the functional component 20 is obtained by measuring the circumferential length of the functional component 20 at positions corresponding to the aforementioned three positions of the functional component 20 and averaging the circumferential lengths measured at these three positions.

By appropriately setting the circumferential length $D2_u$ of the housing space 13 and the circumferential length $D1_u$ of the functional component 20 as just described, the restricting force of the housing body 10 with respect to the functional component 20 can be increased, and the motion of the functional component 20 can be suppressed. Thus, the housing 21 of the functional component 20 can be prevented from being damaged during high-speed travel. In addition, a good balance between the restricting force of the housing body 10 with respect to the functional component 20 and the degree of deformation at which the housing body 10 is not damaged is provided, and thus damage of the housing body 10 can also be prevented.

Here, when the ratio $D2_u/D1_u$ is less than 0.60, the degree of deformation of the crown portion 12 also increases though the restricting force by the housing body 10 increases. As a result, cracks are generated in the housing body 10 during long-distance travel, and the possibility of damage of the housing body 10 increases. On the other hand, when the ratio $D2_u/D1_u$ is larger than 0.95, the restricting force by the housing body 10 decreases, and the motion of the functional component 20 in the housing body 10 increases. This increases heat generation due to friction between the housing body 10 and the functional component 20, resulting in damage of the housing 21 of the functional component 20.

Further, a circumferential length $D2_O$ of the opening portion 14 of the housing body 10 and the circumferential length $D1_u$ of the upper portion of the functional component 20 preferably satisfy the relationship $0.4 \leq D2_O/D1_u \leq 0.8$. Here, the circumferential length $D2_O$ of the opening portion 14 is a circumferential length of the opening portion 14 measured in a state where the functional component 20 is not housed in the housing body 10. By appropriately setting the circumferential length $D2_O$ of the opening portion 14 and the circumferential length $D1_u$ of the functional component 20 as just described, a good balance between the restricting force of the housing body 10 with respect to the functional component 20 and the degree of deformation at which the housing body 10 is not damaged can be provided, and the durability of the functional component 20 during high-speed travel can be improved. Furthermore, the opening portion 14 of the housing body 10 is not excessively narrow; which is suitable in removing the functional component 20.

Here, when the ratio $D2_O/D1_u$ is less than 0.4, the opening portion 14 is excessively narrow; and thus it becomes difficult to remove the functional component 20. On the other hand, when the ratio $D2_O/D1_u$ is larger than 0.8, the restricting force by the housing body 10 decreases, and the motion of the functional component 20 in the housing body 10 increases. This increases heat generation due to friction between the housing body 10 and the functional component 20, resulting in damage of the housing 21 of the functional component 20.

In addition, the housing body 10 can be made of rubber, elastomer, resin, or the like. In particular, the constituent material of the housing body 10 preferably has the following physical properties. The modulus of the housing body 10 at 100% elongation at 20° C. is preferably 0.5 MPa or more and less than 10.0 MPa, and the loss modulus of the housing body 10 at 60° C. is preferably 0.4 MPa or more and less than 20.0 MPa. By appropriately setting the modulus as just described, the durability of the housing body 10 and ease of housing the functional component 20 in the housing body 10 can be provided in a compatible manner. By appropriately setting the loss modulus as just described, the housing 21 of the functional component 20 can be prevented from being damaged due to rubbing of the functional component 20 against the housing body 10 or repeated deformation of the housing body 10.

In the aforementioned embodiment, an example in which the housing body with a functional component is attached to the pneumatic tire is described but no such limitation is intended, and the housing body with a functional component can be applied to a non-pneumatic tire.

EXAMPLE

Tires of Conventional Example, Comparative Example, and Examples 1 to 8 were manufactured. Each of the tires has a tire size of 225/45R18 and includes a functional component configured to acquire tire information and a rubber housing body adapted to house the functional component. In a pneumatic tire having a tire inner surface to which the housing body housing the functional component is fixed, the functional component includes a housing containing an electronic component and a film-shaped piezoelectric element fixed to a wall surface of the housing. One projection is formed on a bottom surface of the housing body. At least a part of the projection and the piezoelectric element are directly in contact with each other in an unloaded state and in a state where the functional component is housed in the housing body. In each tire, the presence of the projection, the area S of the upper surface of the projection, the area A of the bottom surface of the projection, the area ratio A/S, the area ratio A/A', the angle α of the upper portion of the projection, the angle β of the bottom portion of the projection, the ratio of the contact area of the projection to the area of the inner surface of the housing body on which the projection is formed, the ratio of the contact area of the projection to the surface area of a pressure sensing portion of the piezoelectric element, the height h of the projection, and M100 of the projection were set as indicated in Table 1.

In each test tire, the piezoelectric element disposed in the housing of the functional component has a circular shape with a diameter d1 of 10 mm, and is disposed in the central portion of the bottom surface of the housing of the functional component. In the tire of Comparative Example, the projection disposed in the housing body has a cylindrical shape. In addition, in the tires of Comparative Example and Examples 1 to 8, the project is formed on the bottom surface of the housing body.

Note that "M100 of the projection" means the modulus at 100% elongation (MPa), is measured in a tensile test at 23° C. in conformance with JIS (Japanese Industrial Standard) K6251 (using a dumbbell No. 3), and indicates tensile stress at 100% elongation.

For these test tires, sensing intensity and fracture resistance were evaluated by the following test methods, and the results are shown in Table 1.

Sensing Intensity:

Each of the test tires was mounted on a wheel having a rim size of 18×7.5 J, an 80% load of the maximum load capacity was applied, and a running test was performed on the tire using a drum testing machine under air pressure of 230 kPa, at travel speed of 30 km/h, and with distance traveled of 10 km. Specifically, ten tires were used for each test tire, strain of the inner surface of the tire was measured by the piezoelectric element, and the measured strain values were averaged. Evaluation results are expressed as index values with the measurement value of Conventional Example being defined as 100. Larger index values indicate superior sensing intensity.

Fracture Resistance:

Each of the test tires was mounted on a wheel having a rim size of 18×7.5 J, an 80% load of the maximum load capacity was applied, and a running test was performed on the tire using a drum testing machine under air pressure of 360 kPa, at travel speed of 300 km/h, and with distance traveled of 15000 km. Thereafter, the degree of fracture of the projection was visually confirmed, and the number of sections where cracks were generated at the projection was counted. The evaluation results are represented with the use of reciprocals of the measurement values and by index values with the value of Comparative Example being assigned 100. Larger index values indicate superior fracture resistance.

TABLE 1

| | Conventional Example | Comparative Example | Example 1 | Example 2 | Example 3 |
|---|---|---|---|---|---|
| Presence of projection | No | Yes | Yes | Yes | Yes |
| Area S (mm$^2$) of upper surface of projection | — | 50 | 50 | 50 | 50 |
| Area A (mm$^2$) of bottom surface of projection | — | 50 | 55 | 300 | 150 |
| Area ratio A/S | — | 1.0 | 1.1 | 6.0 | 3.0 |
| Area ratio A/A' | — | 0.17 | 0.18 | 1.00 | 0.50 |
| Angle α (°) of upper portion of projection | — | 90 | 20 | 20 | 20 |
| Angle β (°) of bottom portion of projection | — | 90 | 130 | 130 | 130 |
| Ratio (%) of contact area of projection to area of inner surface of housing body on which projection is formed | — | 2 | 2 | 2 | 2 |
| Ratio (%) of contact area of projection to surface area of pressure sensing portion of piezoelectric element | — | 8 | 8 | 8 | 8 |
| Projection height h (mm) | — | 2.5 | 2.5 | 2.5 | 2.5 |
| M100 of projection (MPa) | — | 1.6 | 1.6 | 1.6 | 1.6 |
| Sensing intensity | 100 | 102 | 102 | 102 | 102 |
| Fracture resistance | — | 100 | 101 | 120 | 110 |

| | Example 4 | Example 5 | Example 6 | Example 7 | Example 8 |
|---|---|---|---|---|---|
| Presence of projection | Yes | Yes | Yes | Yes | Yes |
| Area S (mm$^2$) of upper surface of projection | 50 | 50 | 50 | 50 | 50 |
| Area A (mm$^2$) of bottom surface of projection | 150 | 150 | 150 | 150 | 150 |
| Area ratio A/S | 3.0 | 3.0 | 3.0 | 3.0 | 3.0 |
| Area ratio A/A' | 0.50 | 0.50 | 0.50 | 0.50 | 0.50 |
| Angle α (°) of upper portion of projection | 45 | 45 | 45 | 45 | 45 |
| Angle β (°) of bottom portion of projection | 130 | 160 | 160 | 160 | 160 |
| Ratio (%) of contact area of projection to area of inner surface of housing body on which projection is formed | 2 | 2 | 17 | 17 | 17 |
| Ratio (%) of contact area of projection to surface area of pressure sensing portion of piezoelectric element | 8 | 8 | 64 | 64 | 64 |
| Projection height h (mm) | 2.5 | 2.5 | 2.5 | 0.8 | 0.8 |
| M100 of projection (MPa) | 1.6 | 1.6 | 1.6 | 1.6 | 10.1 |
| Sensing intensity | 105 | 105 | 112 | 113 | 115 |
| Fracture resistance | 109 | 110 | 110 | 112 | 113 |

As can be seen from Table 1, the pneumatic tires of Examples 1 to 8 have improved sensing intensity as compared with Conventional Example and improved fracture resistance of the projection as compared with Comparative Example. In the pneumatic tires of Examples 1 to 8, it was confirmed that the effect of improving sensing intensity could be sufficiently obtained and that the tire internal information could be accurately acquired.

In Comparative Example having the projection, sensing intensity could be improved as compared with Conventional Example; however, the effect of improving fracture resistance of the projection could not be sufficiently obtained because the projection had a cylindrical shape.

The invention claimed is:

1. A tire, comprising:

a functional component configured to acquire tire information; and a housing body adapted to house the functional component, the housing body being fixed to a tire inner surface, the functional component being housed in the housing body, the functional component comprising a housing containing an electronic component, and a piezoelectric element having a film-shape and being fixed to a wall surface of the housing, at least one projection being formed on an inner surface of the housing body, and at least a part of the projection and the piezoelectric element being directly in contact with each other or indirectly in contact with each other via the wall surface of the housing in an unloaded state of the tire, and in a top view of the projection, an area of a bottommost surface of the projection being larger than an area of an uppermost portion of the projection, and an outer edge of the uppermost portion of the projection being located on an inner side of an outer edge of the bottommost surface of the projection, wherein a bottom surface of the functional component is not fitted to the projection, and each of the projection and the piezoelectric element have a smaller cross-sectional width than cross-sectional widths of each of the housing body and the functional component.

2. The tire according to claim 1, wherein when a height position of 95% of a height h of the projection from the inner surface of the housing body on which the projection is formed is defined as a position G, an area S of the projection at the position G and an area A of the bottommost surface of the projection satisfy a relationship $A \geq 1.04 \times S$.

3. The tire according to claim 1, wherein an area A of the bottommost surface of the projection and an area A' of a bottom surface of an inner portion of the housing body satisfy a relationship $A \leq 0.82 \times A'$.

4. The tire according to claim 1, wherein when a lateral point of the projection at a height half a height h of the projection from the inner surface of the housing body on which the projection is formed is defined as point M, an angle α formed by a straight line connecting an end point P of the uppermost portion of the projection and the point M and a straight line passing through the end point P and parallel to the bottommost surface of the projection is 30° to 90°.

5. The tire according to claim 1, wherein when a lateral point of the projection at a height half a height h of the projection from the inner surface of the housing body on which the projection is formed is defined as point M, an angle β formed by a straight line connecting an end point Q of the bottommost surface of the projection and the point M and the inner surface of the housing body on which the projection is formed is 90° to 180°.

6. The tire according to claim 1, wherein a contact area between the projection and the piezoelectric element is 50% or less with respect to an area of the inner surface of the housing body on which the projection is formed, and is 10% to 100% with respect to a surface area of a pressure sensing portion of the piezoelectric element.

7. The tire according to claim 1, wherein a height h of the projection from the inner surface of the housing body on which the projection is formed is 0.1 mm to 2.0 mm.

8. The tire according to claim 1, wherein the projection is made of vulcanized rubber having a modulus at 100% elongation of 1.0 MPa or more and less than 12.0 MPa.

9. The tire according to claim 2, wherein an area A of the bottommost surface of the projection and an area A' of a bottom surface of an inner portion of the housing body satisfy a relationship $A \leq 0.82 \times A'$.

10. The tire according to claim 9, wherein when a lateral point of the projection at a height half a height h of the projection from the inner surface of the housing body on which the projection is formed is defined as point M, an angle α formed by a straight line connecting an end point P of the uppermost portion of the projection and the point M and a straight line passing through the end point P and parallel to the bottommost surface of the projection is 30° to 90°.

11. The tire according to claim 10, wherein when a lateral point of the projection at a height half a height h of the projection from the inner surface of the housing body on which the projection is formed is defined as point M, an angle β formed by a straight line connecting an end point Q of the bottommost surface of the projection and the point M and the inner surface of the housing body on which the projection is formed is 90° to 180°.

12. The tire according to claim 11, wherein a contact area between the projection and the piezoelectric element is 50% or less with respect to an area of the inner surface of the housing body on which the projection is formed, and is 10% to 100% with respect to a surface area of a pressure sensing portion of the piezoelectric element.

13. The tire according to claim 12, wherein a height h of the projection from the inner surface of the housing body on which the projection is formed is 0.1 mm to 2.0 mm.

14. The tire according to claim 13, wherein the projection is made of vulcanized rubber having a modulus at 100% elongation of 1.0 MPa or more and less than 12.0 MPa.

* * * * *